United States Patent [19]

Deguchi et al.

[11] 3,913,132

[45] Oct. 14, 1975

[54] METHOD FOR RECORDING CONTROL SIGNAL ON MASTER TAPE IN CONTACT VIDEO TAPE PRINTER

[75] Inventors: Masahiro Deguchi, Yao; Masaru Hashirano, Moriguchi, both of Japan

[73] Assignee: Matsushita Electric Industrial Co., Ltd., Japan

[22] Filed: Dec. 20, 1973

[21] Appl. No.: 426,827

[30] Foreign Application Priority Data

Dec. 30, 1972 Japan .................................. 48-2953

[52] U.S. Cl. .................................................. 360/17
[51] Int. Cl. ............................................ G11b 5/86
[58] Field of Search ................................ 360/16, 17

[56] References Cited

UNITED STATES PATENTS 3,652,808 3/1972 Esterly et al. ......................... 360/16
3,696,219 10/1972 Arimura et al. ...................... 360/17

*Primary Examiner*—Bernard Konick
*Assistant Examiner*—R. S. Tupper
*Attorney, Agent, or Firm*—Burgess, Ryan and Wayne

[57] ABSTRACT

In a method for duplicating a signal recorded upon a master tape onto a printing tape by bringing the coated surfaces of both tapes into close contact with each other in a magnetic field, a control signal, which is recorded upon the master tape and is reproduced in order to control magnetic video reproducing equipment, has such a waveform that its rising or falling portion has a gentle gradient or slope. This method is very effective to eliminate noise pulses in the control signal reproduced from the print or prerecorded tape.

3 Claims, 8 Drawing Figures

METHOD FOR RECORDING CONTROL SIGNAL ON MASTER TAPE IN CONTACT VIDEO TAPE PRINTER

BACKGROUND OF THE INVENTION

The present invention relates to a method for duplicating from a master tape, to a printing tape a control signal which is reproduced in order to control magnetic video reproducing equipment, in which method the control signal has such a waveform that its rising or falling portion has a gentle gradient or slope in order to suppress noise pulses in the control signal reproduced from the printing or prerecorded tape.

In the conventional method for duplicating a video signal recorded on a master magnetic tape onto a printing magnetic tape, a tape reel takes up both the master and printing tapes at a high speed in such a way that the coated surfaces, that is the surfaces upon which the magnetic layers are formed, are brought into close contact with each other, and heat or magnetic flux is applied to them, revolving the tape reel at a low speed so that the video signal upon the master tape may be duplicated upon the printing tape. Since the duplicating efficiency of the low frequency components is low while the efficiency of the high frequency components is high, a control signal of a rectangular or pulse waveform with positive polarity is differentiated once when it is duplicated from a master tape to a printing tape. The control signal with the opposite polarity is recorded upon a printing tape, and print-through noise pulses are also duplicated because of the print-through of the control signals from the adjacent layers of the master tape to the adjacent layers of the printing tape. When the print-through noise pulses are superposed upon the improperly duplicated control signal with positive polarity and the tape is used to control a tracking servo system in magnetic video reproducing equipment, the S/N ratio is extremely adversely affected so that the servo system becomes out of control in case of reproduction.

SUMMARY OF THE INVENTION

One of the objects of the present invention is therefore to provide a method for duplicating a control signal from a master magnetic tape to a printing tape without introducing duplicating noise.

Another object of the present invention is to provide a method for duplicating a control signal, which is to be reproduced in order to control a magnetic video reproducing equipment, in such a way that signals with a polarity opposite to that of the reference pulses may not be produced.

A further object of the present invention is to provide a method for duplicating a control signal from a master tape to a printing tape in such a way that the control signal reproduced from the printing tape will not cause any hunting of a tracking servo system of a magnetic video reproducing equipment.

Briefly stated, according to the present invention, a control signal recorded upon a master tape has such a trapezoidal or saw-tooth waveform with a gentle gradient or slope, so that the control signal reproduced from a printing tape has only one polarity. Therefore, a reference signal with one polarity may be used, and an error correction of a control head in a magnetic video reproducing equipment may be easily and readily detected.

The above and other objects, features and advantages of the present invention will become more apparent from the following description of one preferred embodiment thereof taken in conjunction with the accompanying drawings.

DESCRIPTION OF THE PREFERRED EMBODIMENT

Prior Art, FIGS. 1 – 4

Prior to the description of the preferred embodiment of the present invention, the prior art method will be described briefly with reference to FIGS. 1 – 4 in order to distinctly point out the problems thereof, which the present invention obviates.

Figure 1:
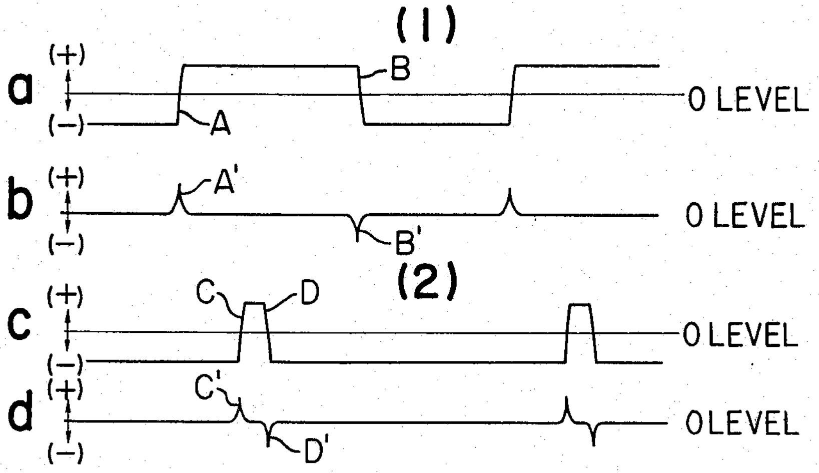
FIG. 1 shows the waveforms of a control signal for magnetic video reproducing equipment, directly recorded on a magnetic tape, and the waveform of a reproduced signal from a printing tape.

Control signals of a rectangular or pulse waveform, which are recorded on a magnetic tape and reproduced in order to control a magnetic video reproducing equipment, are differentiated when they are reproduced. For instance, as shown in FIG. 1, the positive polarity control signals A and C of rectangular waveform *a* and of pulse waveform *c* and negative-polarity control signals B and D are reproduced as positive-polarity pulses A′ and C′ and as negative-polarity pulses B′ and D′, respectively. The reproduced positive or negative polarity pulses are used to control a synchronization or servo system in magnetic video reproducing equipment.

Figure 2:
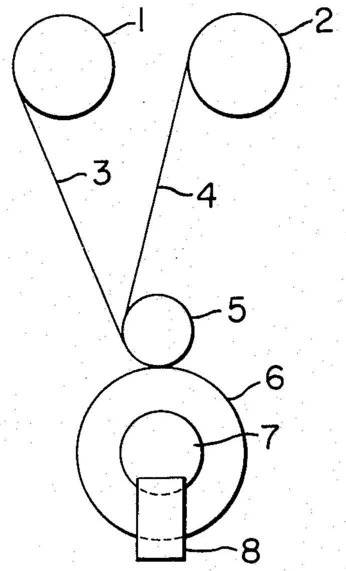
FIG. 2 is a view illustrating the conventional method for duplicating a video signal recorded on a master magnetic tape onto a printing magnetic tape by contacting.

Next referring to FIG. 2, a conventional method for duplicating the control signal of rectangular or pulse waveform recorded on a master tape onto a new printing tape will be described. A master tape 3 and a printing tape 4 supplied from supply reels 1 and 2, respectively, are wrapped around a capstan 5, which also functions as a pressure roller, in such a way that their coated surfaces are brought into close contact with each other, and taken up by a take-up reel 7 at a high speed. Thereafter, the master and printing tapes 3 and 4 are subjected to magnetic fluxes produced by a magnetic flux generator 8 while the supply reels 1 and 2 rewind the master and printing tapes 3 and 4 at a low speed, respectively.

Figure 3:
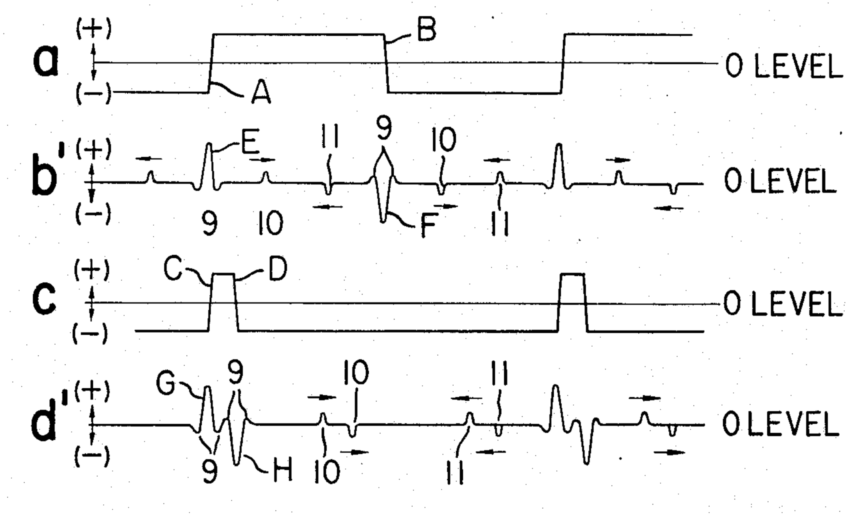
FIGS. 3 and 4 show the waveforms of reproduced signal and the control signal of the prior art.
Figure 5:
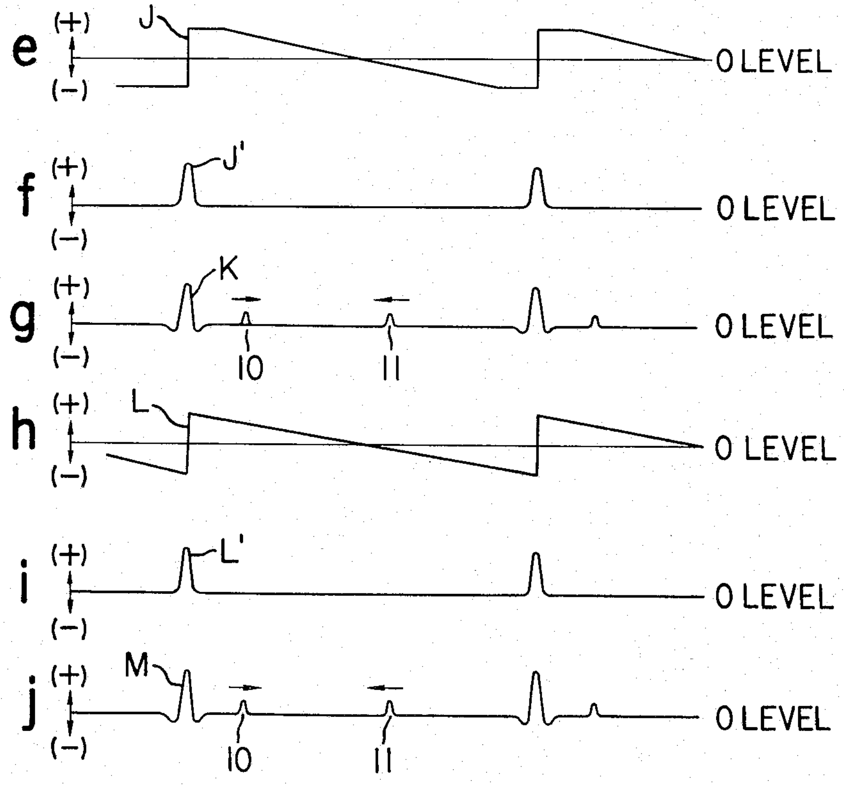
FIG. 5 shows the waveform of control signal and reproduced signal according to this invention.
Figure 4:
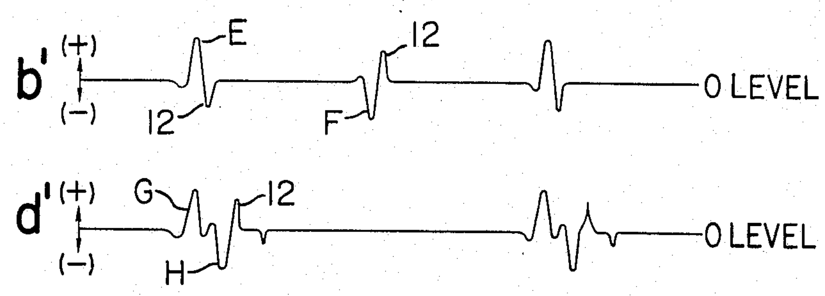

The control signals which are reproduced from the printing tape by a video tape recorder are shown in FIGS. 3*b*′ and 3*d*′. The leading edges of the rectangular or pulse waveform control signals are reproduced as indicated by E and G while the trailing edges are reproduced as shown by F and G. When these reproduced control signals are compared with those reproduced from the master tape (See FIG. 1, A to D), it is seen that the reproduced control signals have transients with the opposite polarities as indicated by 9 in FIG. 3. This is brought about by the fact that the duplicating efficiency of the low frequency components is poor while the efficiency of high, frequency components is high so that the signals which are once differentiated are duplicated onto the printing tape. Furthermore, it is seen that print-through noise pulses 10 and 11 are produced because of the printing or duplicating method described above with reference to FIG. 2. That is, the control signals recorded on the master tape 3 are duplicated onto both the outer and inner adjacent layers of the printing tape in the case of duplication. The print-through noise pulse 10 lags, as indicated by the arrow, in phase behind the control signal E, F, G or H, because the control signal recorded upon the outer adjacent layer of the master tape, which is in radially outward contact with a layer of the printing tape and has a larger diameter than that of the inner adjacent layer of the master tape, is duplicated onto the adjacent layer of the printing tape. On the other hand, the print-through noise pulse 11 advances in phase in the direction indicated by the arrow because the control signal recorded on the inner adjacent layer of the master tape, which is in radially inward contact with the layer of the printing tape and has a smaller diameter than the outer adjacent layer of the original tape, is duplicated onto the adjacent layer of the printing tape. Thus, the S/N ratio of the prerecorded tape is adversely affected by both the positive and negative transients 9 and the print-through noise pulses 10 and 11.

For instance when positive polarity control signals are used as reference signals for controlling a tracking servo system of a video tape recorder, the S/N ratio becomes poorest or lowest when the print-through noise pulses 10 and 11 are superposed upon each other and upon the positive transient 9 of the negative polarity pulse signal as shown in FIGS. 4*b'* and 4*d'*. When the operating level of a control signal amplifier in a video tape recorder is low, the highest print-through noise pulse 12 is amplified so that the control by the tracking servo system is adversely affected. The present invention was made to overcome the above problem and will be described in detail hereinafter with reference to FIGS. 5 – 8.

THE INVENTION, FIG. 5 – 8

Briefly stated, the present invention is characterized in that the control signal recorded on a master tape is in the form of a trapezoidal or saw-tooth waveform with a gentle gradient or slope as shown in FIGS. 5*e* and 5*h*. The outputs of a control head, which reproduces the control signal, are shown in FIGS. 5*f* and 5*i*. It is seen that pulse-like waveforms J' and L' are produced in response to the leading edges J and L of the trapezoidal and saw-tooth waveform control signals, and that the pulse signals which correspond to the leading edges or falling portions of the control signals are extremely low or negligible because of the poor signal recording efficiency.

When the trapezoidal wave has a sharp gradient as shown in FIG. 5*e*, some pulses are also produced, but they are very low in level. FIGS. 5*g* and 5*j* show the waveforms of the control signals reproduced by a conventional video tape recorder from a prerecorded tape which is produced by the method described with reference to FIG. 2 from a master tape upon which are recorded the control signals of trapezoidal waveform as shown in FIG. 5*e* or the saw-tooth waveform as shown in FIG. 5*h*. The pulse signals K and M are produced in response to the leading edges of the prerecorded control signals, and print-through noise pulses 10 and 11 are produced from the control signals recorded upon the outer and inner adjacent layers of the master tape. When the waveforms shown in FIGS. 5*g* and 5*j* are compared with those shown in FIGS. 3*b'* and 3*d'*, it is seen that the former have no negative polarity pulses so that there is no positive transient of a negative polarity control pulse. Therefore, the worst noise pulse is produced only when both print-through noise pulses 10 and 11 are superposed upon each other. Thus, the S/N ratio can be improved by a factor corresponding to the positive transient of a negative polarity control pulse, so that the hunting of the control system of a video tape reproducing equipment may be completely eliminated.

Figure 7:
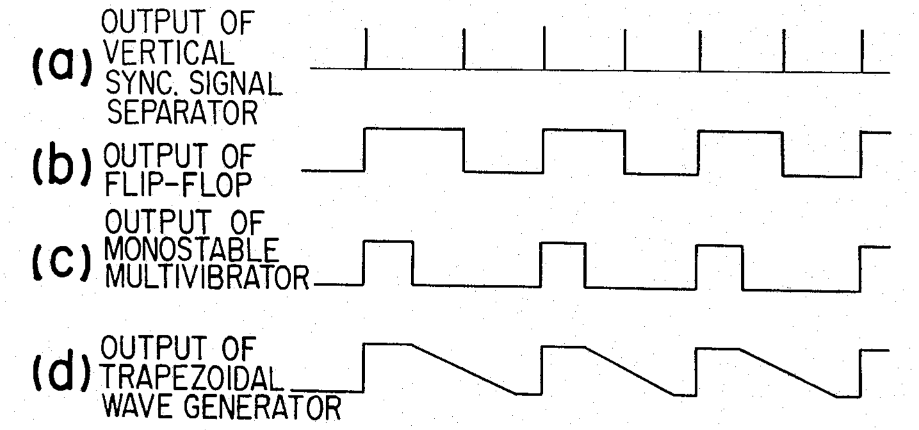
FIG. 7 shows the output waveforms at various stages of the FIG. 6.
Figure 6:
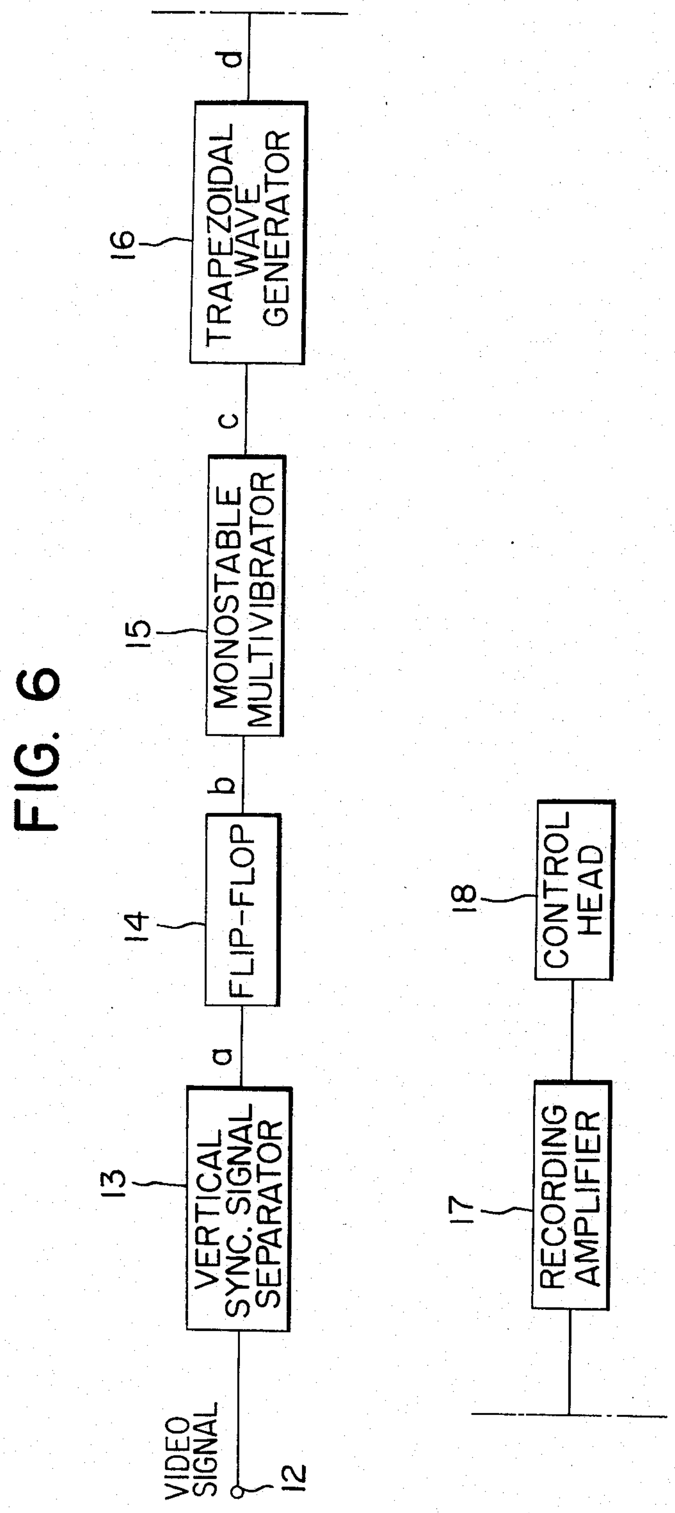
FIG. 6 is the block diagram for the generation of a trapezoidal wave according to this invention.

Next referring to FIG. 6 illustrating in block diagrams the circuits for generating a trapezoidal waveform control signal, a control signal is separated from a composite video signal applied to an input terminal 12 by a vertical sync signal separator 13. The output of the sync signal separator 13 as shown in FIG. 7(*a*) is transferred to a flip-flop 14 so that it may be shaped into a waveform with a desired pulse duration as shown in FIG. 7(*b*). The output of the flip-flop 14 is applied to a monostable multivibrator 15 so that the pulse duration may be reduced as shown in FIG. 7(*c*). The output of the monostable multivibrator 15 is applied to a trapezoidal wave generator 16 so that it may be shaped as shown in FIG. 7(*d*). The output of the generator 16 is applied to a recording amplifier 17 and is recorded upon a master tape through a magnetic control head 18. A bootstrap circuit may be used as a trapezoidal wave generator.

Figure 8:
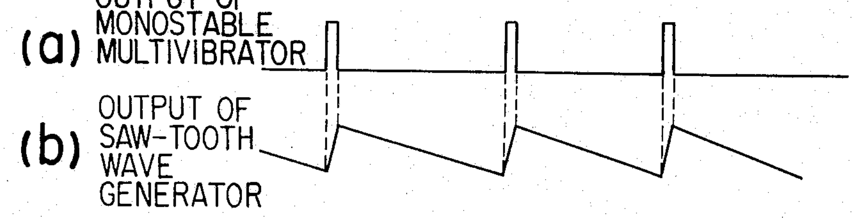
FIG. 8 shows another output of saw-tooth waveform from the device shown in FIG. 6.

In order to produce the control signal of a saw-tooth wave, a conventional saw-tooth wave generator may be inserted instead of the trapezoidal wave generator 16. The output of the monostable vibrator 15 is shaped into the saw-tooth wave as shown in FIG. 8(*b*).

What is claimed is:

1. A method for duplicating a control signal from a master tape onto a copy tape in a video tape duplicator of the type wherein magnetic layers of a master tape and a copy tape are brought into close contact with one another to enable the printing of the signal recorded on the master tape onto the copy tape; said method comprising recording a control signal on said master tape having a gradient of one of its leading and trailing edges that is gentler than the other of said leading and trailing edges, then bringing said master tape with said control signal recorded thereon into close contact with said copy tape and duplicating said control signal on said master tape onto said copy tape.

2. The method of claim 1, wherein said step of recording said control signal comprises recording a control signal of a trapezoidal wave form having one of its leading and trailing edges of a gentler gradient than the other of said leading and trailing edges.

3. A method for duplicating a control signal from a master tape onto a copy tape in a contact type of video tape duplicator, comprising recording on a master tape a control signal having a saw tooth shaped wave form with one of its leading and trailing edges gentler in gradient than the other of its leading and trailing edges, then bringing said master tape with said control signal recorded thereon into close contact with a copy tape and duplicating said control signal on said master tape onto said copy tape.

* * * * *